June 3, 1930.  I. B. BJORNSON  1,761,067
CULINARY UTENSIL
Filed Aug. 10, 1928
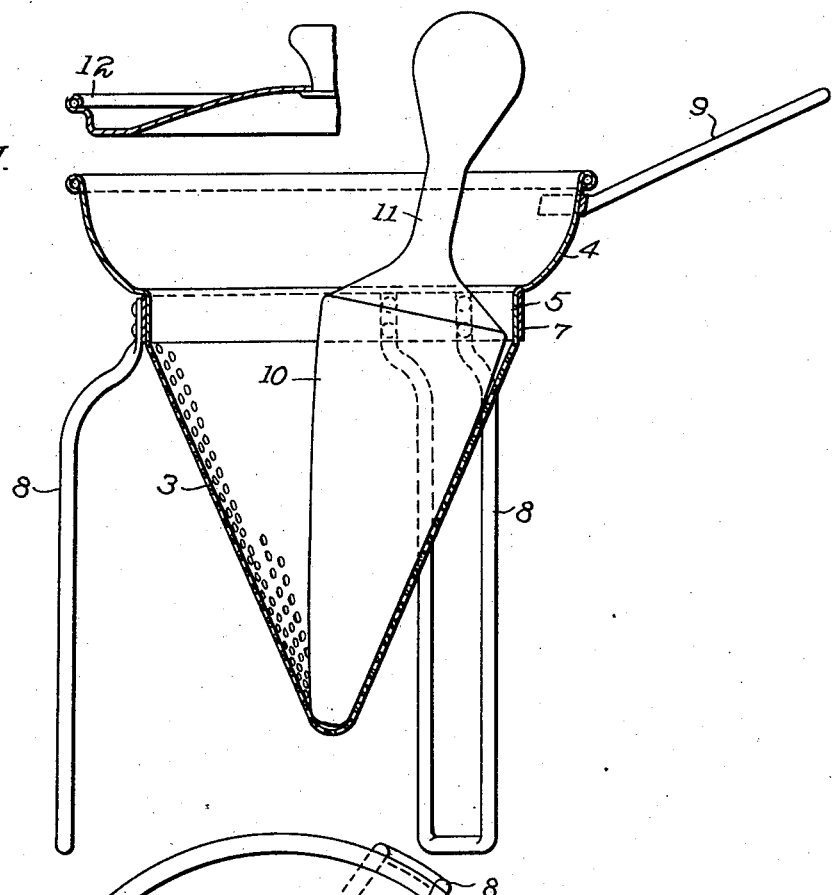
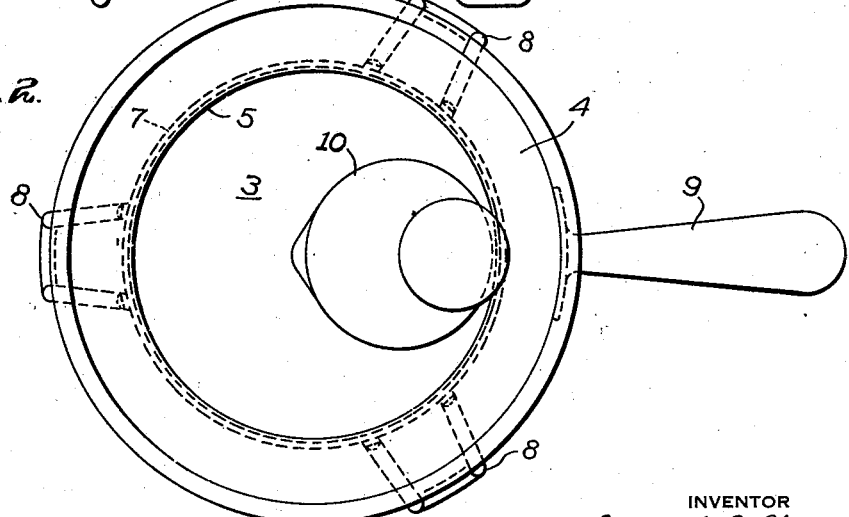
INVENTOR
Ingvard B. Bjornson
By Archworth Martin,
Attorney.

Patented June 3, 1930

1,761,067

UNITED STATES PATENT OFFICE

INGVARD B. BJORNSON, OF NEW KENSINGTON, PENNSYLVANIA, ASSIGNOR TO THE ALUMINUM COMPANY OF AMERICA, OF PITTSBURGH, PENNSYLVANIA, A CORPORATION OF PENNSYLVANIA

CULINARY UTENSIL

Application filed August 10, 1928. Serial No. 298,802.

My invention relates to culinary utensils, and more particularly to those employed as vegetable and fruit presses, strainers, potato ricers, etc., wherein the vegetable or other material is forced through a strainer of cone shape or other form.

One object of my invention is to provide a strainer or other vessel of such form that the working or squeezing of the material therein will not result in such material being forced out over the upper edge of the vessel.

Another object of my invention is to provide a crusher or squeezing tool of such form that the tendency thereof to force the material over the upper edge of the vessel is reduced.

Another object of my invention is to simplify and improve generally utensils of the character referred to.

One form which my invention may take is shown in the accompanying drawing wherein Fig. 1 is an elevational sectional view of a utensil constructed according to my invention, and Fig. 2 is a plan view thereof.

The numeral 3 represents a strainer of generally inverted cone shaped, but which is flared at 4, for the purpose hereinafter explained, the flared portion 4 having connection, through a vertically straight or cylindrical portion 5, with the conical portion 3. The cylindrical portion 5 fits within a band or a ring 7 that serves as a seat or holder for the vessel, which seating ring is mounted upon legs 8 that are suitably attached thereto. A handle 9 is secured to the vessel 3.

The strainer 3 is preferably formed of aluminum or other sheet metal, by stamping, which renders it seamless.

A conically shaped crusher 10 is employed for mashing material or forcing it through the perforations of the vessel. The working of the material tends to force it upwardly along the sides of the vessel, and I make provision for preventing such material from overflowing at the outer edge of the vessel, by flaring the vessel, as indicated at 4, which provides additional space wherein the material may accumulate and eventually fall again into the conical portion of the vessel. The additional room or space provided by the flare 4 results in relieving the material therein of the pressure to which it is subjected through manipulation of the crusher 10.

As a further means for relieving this material of pressure I reduce the diameter of the crushed at 11, since if such reduced portion were of considerable greater diameter it would press upon the material in the upper portion of the vessel to a greater extent, thus tending to force it over the edge of the vessel.

A lid or cover 12 is provided, for closing the vessel if desired, when the crusher is not being used.

It will be seen that my invention is applicable to vessels of shapes other than inverted cones and that various other changes in detail and general arrangement may be made without departing from the spirit and scope of the invention.

I claim as my invention:

1. Utensil structure comprising a vessel having its upper portion flared relative to its lower portion, and a crusher having a crushing portion, a handle portion, and an intermediate portion of reduced diameter, the said portion of reduced diameter normally being disposed in the plane of said flared portion of the vessel.

2. Utensil structure comprising a vessel having a lower portion of inverted conical form and an upper portion flared and serving as the mouth of the vessel, a crusher of conical form having a crushing surface substantially coextensive in length with the length of the conical portion and a reduced handle portion extending upwardly from said conical portion.

In testimony whereof I, the said INGVARD B. BJORNSON, have hereunto set my hand.

INGVARD B. BJORNSON.